(12) United States Patent
Axelrod

(10) Patent No.: US 7,087,260 B2
(45) Date of Patent: Aug. 8, 2006

(54) ANIMAL CHEW TOY WITH FLOSSING RIBS/PROJECTIONS

(75) Inventor: Glen S. Axelrod, Colts Neck, NJ (US)

(73) Assignee: T.F.H. Publications, Inc., Neptune City, NJ (US)

( * ) Notice: Subject to any disclaimer, the term of this patent is extended or adjusted under 35 U.S.C. 154(b) by 0 days.

(21) Appl. No.: 10/419,369

(22) Filed: Apr. 21, 2003

(65) Prior Publication Data

US 2004/0137118 A1    Jul. 15, 2004

Related U.S. Application Data

(60) Provisional application No. 60/438,865, filed on Jan. 9, 2003.

(51) Int. Cl.
    *A23K 1/00* (2006.01)
(52) U.S. Cl. ............... 426/623; 426/104; 426/512; 426/513; 426/805; 426/72; 426/549; 426/132; 119/707; 119/709; 119/710
(58) Field of Classification Search ............ 426/132, 426/104, 512, 513, 805, 72, 549, 623; 119/707, 119/709, 710
See application file for complete search history.

(56) References Cited

U.S. PATENT DOCUMENTS

| 3,871,334 A | 3/1975 | Axelrod .................. 119/29.5 |
|---|---|---|
| 4,513,014 A | 4/1985 | Edwards .................... 426/132 |
| 4,557,219 A | 12/1985 | Edwards .................. 119/29.5 |
| 4,586,751 A * | 5/1986 | McGuire .................. 297/451.9 |
| 4,771,733 A | 9/1988 | Axelrod .................. 119/29.5 |
| 4,802,444 A * | 2/1989 | Markham et al. .......... 119/710 |
| 5,000,940 A | 3/1991 | Staples et al. ............. 424/49 |
| 5,000,943 A | 3/1991 | Scaglione et al. .......... 424/57 |
| 5,100,651 A | 3/1992 | Boyer ...................... 424/52 |
| 5,200,212 A | 4/1993 | Axelrod ..................... 426/2 |
| 5,240,720 A | 8/1993 | Axelrod ..................... 426/2 |
| 5,263,436 A * | 11/1993 | Axelrod .................. 119/710 |
| 5,407,661 A * | 4/1995 | Simone et al. ............. 424/49 |
| 5,419,283 A * | 5/1995 | Leo ....................... 119/709 |
| 5,476,069 A * | 12/1995 | Axelrod .................. 119/709 |
| 5,647,302 A * | 7/1997 | Shipp ..................... 119/709 |
| 5,711,254 A | 1/1998 | O'Rourke ................. 119/710 |
| 5,827,565 A * | 10/1998 | Axelrod .................. 426/623 |
| 5,941,197 A * | 8/1999 | Axelrod .................. 119/710 |
| 6,093,427 A | 7/2000 | Axelrod .................. 426/104 |
| 6,093,441 A | 7/2000 | Axelrod .................. 426/632 |
| 6,110,521 A | 8/2000 | Axelrod .................. 426/549 |
| 6,126,978 A | 10/2000 | Axelrod .................. 426/285 |
| 6,148,771 A * | 11/2000 | Costello .................. 119/709 |
| 6,159,516 A | 12/2000 | Axelrod et al. ........... 426/456 |
| 6,180,161 B1 | 1/2001 | Axelrod .................. 426/623 |
| 6,200,616 B1 | 3/2001 | Axelrod et al. ........... 426/285 |
| 6,265,011 B1 * | 7/2001 | Kelly et al. .............. 426/549 |
| 6,305,326 B1 * | 10/2001 | Suchowski et al. ......... 119/709 |
| 6,379,725 B1 * | 4/2002 | Wang et al. ............... 426/72 |
| 6,439,166 B1 | 8/2002 | Markham .................. 119/710 |

* cited by examiner

*Primary Examiner*—Milton I. Cano
*Assistant Examiner*—Sarah L. Kuhns
(74) *Attorney, Agent, or Firm*—Grossman, Tucker, Perreault & Pfleger, PLLC

(57) ABSTRACT

An edible animal chew toy which provides a dental benefit when chewed. The chewing action of the animal causes ribs and/or protrusions on the chew toy, in close proximity to the area being chewed, to floss the sides of the animal's teeth and gums.

25 Claims, 2 Drawing Sheets

ANIMAL CHEW TOY WITH FLOSSING RIBS/PROJECTIONS

CROSS REFERENCE TO RELATED APPLICATIONS

This application claims priority to U.S. Provisional Application No. 60/438,865 filed Jan. 9, 2003.

FIELD OF THE INVENTION

The present invention relates to an improved animal chew toy comprising ridges and projections of selected size and shape and placement on the chew toy which therefore provides a dental benefit when chewed by an animal.

BACKGROUND OF THE INVENTION

Animal pets, such as dogs and cats, like their human counterparts, are subject to dental health problems. These problems can be traced to the formation of bacterial plaque that forms on the exterior surface of teeth. Plaque is an invisible, sticky film of bacteria, salivary proteins and polysaccharides that are not easily washed away. Plaque is now generally recognized as the main culprit of poor oral health. Bacteria that produce the acid for the caries process are held to the tooth surface by the plaque matrix as well as other bacteria which cause redness and swelling (gingivitis). The presence of these bacteria, if left untreated, may spread to cause malodor, periodontal disease, gingival pockets and bone loss.

Dental calculus, or tartar, is the result of the thickening and hardening (mineralization) of dental plaque. Tartar, which is not easily removed, accumulates on the tooth surface, mainly at the gingival margin opposite the salivary glands. It is a hard mineral deposit containing predominantly calcium and phosphate, very tightly bound to the tooth surface. Once it is formed, tartar is virtually impossible to remove except by a dental professional. Tartar can become unsightly if growth is left unimpeded, and elimination is desirable as the porous surface of the calculus will be covered by a thin layer of unmineralized plaque that can cause constant irritation of the gums and can trigger other problems once calculus is formed below the gum line.

A variety of products have been manufactured to provide animal pets with objects to chew or gnaw. They are intended to provide the pet with exercise for the teeth to maintain a healthy condition satisfying a need that arose when the natural pet food, raw meat, was replaced with processed pet foods. Rawhide strips knotted on the ends to resemble bones, for example, provide abrasion for cleaning teeth by removing tartar and massaging the gums, which is not provided by the typical canine dog food.

U.S. Pat. No. 5,827,565 discloses that most dogs enjoy chewing on various objects, although preferences vary as to the desired hardness of those objects. Some dogs like to chew on very hard materials such as cow bones, wood, nylon, and the like. Some dogs, due to their age, may not be able to chew on very hard substances. Young dogs may have insufficiently developed teeth, while older dogs may have diseased gums or may have lost some of their teeth.

The prior art is therefore replete with examples of hard chews, soft chews, indigestible chews, and digestible chews. For example, Applicant's assignee, TFH Publications, Inc. has previously developed an edible dog chew that is wholly digestible, nutritious and maintains a texture or hardness which is individually adjustable, by application of heat to suit a wide variety of preferences or needs. Such dog chews utilize a mixture of primarily casein and are described in U.S. Pat. Nos. 5,200,212 and 5,240,720.

In Applicant's U.S. Pat. No. 5,827,565 there is disclosed a process for making a heat expandable dog chew comprised primarily of injection molded potato starch granules and an attractant. Attractants recited include chicken powder, liver powder, ham, turkey, beef and/or fish. Natural vegetable additives such as spinach or carrots may also be added.

In Applicant's U.S. Pat. No. 6,126,978, which is a continuation-in-part of U.S. Pat. No. 5,827,565, there is disclosed a dog chew having natural fruit flavor to increase the dog's appetite for such chew. The preferred form of such edible chew maintained the basic ingredient of a heat-expandable starch; such as potato starch.

Attention is also directed to the following U.S. patents commonly owned by the assignee herein: U.S. Pat. No. 5,476,069 entitled "Molded Rawhide Chew Toy"; U.S. patent application Ser. No. 08/923,070 filed Sep. 3, 1997 entitled "Vegetable Based Dog Chew" now U.S. Pat. No. 6,093,427; U.S. patent application Ser. No. 08/738,423 filed Oct. 25, 1997 entitled "Edible Dog Chew" now U.S. Pat. No. 5,827,565; U.S. patent application Ser. No. 08/784,834 filed Jan. 17, 1997 entitled "Carrot-Based Dog Chew" now U.S. Pat. No. 5,941,197; U.S. patent application Ser. No. 09/114,872 filed Jul. 14, 1998 entitled "Heat Modifiable Edible Dog Chew" now U.S. Pat. No. 6,180,161; U.S. patent application Ser. No. 09/138,804 filed Aug. 21, 1998 entitled "Improved Edible Dog Chew" now U.S. Pat No. 6,126,978; U.S. patent application Ser. No. 09/116,070 filed Jul. 15, 1998 entitled "Wheat & Casein Dow Chew With Modifiable Texture" now U.S. Pat. No. 6,110,521; U.S. patent application Ser. No. 09/116,555 filed Jul. 15, 1998 entitled "Heat Modifiable Peanut Dog Chew" now U.S. Pat. No. 6,093,441; U.S. patent application Ser. No. 09/227,767 filed Jan. 8, 1999 entitled "Method of Molding Edible Starch" now U.S. Pat. No. 6,159,516; and U.S. Pat. No. 6,200,616 entitled "Animal Chew".

U.S. Pat. No. 5,407,661 entitled "Pet Chew Product Having Oral Care Properties" discloses an edible pet chew product having a flexible cellular matrix in which is contained cellulosic fibrous material such as corn cob fractions which are described as having a mechanical cleansing function when chewed by a pet.

U.S. Pat. No. 5,711,254 entitled "Dog Chew Toy" discloses a chew toy for dogs formed of a length of composite rope having an inner core defined by strands of twisted threads of natural plant or synthetic fibers and a soft outer shell defined by a plurality of strands of soft cotton threads twisted about the inner core. The inner core is said to be less water absorbent than the outer shell to promote drying of the toy when wetted with dog saliva to inhibit bacteria growth.

Other earlier examples of chew products are disclosed in U.S. Pat. No. 3,871,334 to Axelrod (nylon substrate containing liquid flavor and odor components), U.S. Pat. No. 4,771,733 to Axelrod (polyurethane toy containing aqueous-based flavor and odor components), and U.S. Pat. Nos. 4,557,219 and 4,513,014 to Edwards (use of flavorings in a molded polyurethane dog chew).

European Patent 0 272 968 B1 discloses a chewable product for dogs and other domestic animals wherein certain aqueous solutions of oral care agents, e.g., sodium fluoride (anti-caries agent), sodium benzoate (anticalculus agent) and bromochlorophene (antimicrobial/antiplaque agent) are used to soak rawhide, beef tendon, or ligament. The solution treated product is then dried whereby the oral care agents are absorbed into the surface of the product.

U.S. Pat. Nos. 5,000,940 and 5,000,943 disclose baked dog biscuits containing an inorganic pyrophosphate Salt, e.g., tetrasodium pyrophosphate, which when chewed and/or eaten by dogs cause a reduction in tartar accumulations on their teeth.

As can be seen from the above, the prior art has developed examples of hard chews, soft chews, indigestible chews; and digestible chews. All of these prior art animal chews rely on the animal's chewing to cause the bone to contact the teeth. Accordingly, a need remains to advance the design of the prior art products to improve the efficiency of a given chew toy to enhance the dental hygiene requirements of the animal.

There is, therefore, a need in the pet food field for an edible animal chew toy that can rub between the sides of the animal's teeth and massage the gums of the animal to reduce the build up of plaque and loss of teeth due to periodontal disease.

SUMMARY OF THE INVENTION

A method for producing an edible animal chew comprising a molded body portion having a length and an end portion, wherein said chew includes a plurality of outwardly projecting ribs sized to locate between and contact between an animal's teeth when chewed. The method comprises supplying an edible resin with a selected water content, supplying a mold for molding said resin wherein said mold includes a mold cavity that forms a molded body portion of said edible animal chew having a length and an end portion, and wherein said mold includes a plurality of cavities for forming said plurality of outwardly projecting ribs. This is followed by selecting a size for said cavities to provide a projection dimension and/or width dimension for said plurality of ribs which projection and/or width dimension is greater than the projection and/or width dimension of the rib desired for said edible animal chew, and molding said resin into said animal chew containing a plurality of outwardly projecting ribs followed by removing a quantity of said water in said resin and reducing the projection dimension and/or width dimension of said plurality of ribs forming said animal chew.

In related embodiment the present invention relates to an animal chew, comprising a molded body portion having a length and an end portion, said chew including a plurality of outwardly projecting ribs and/or projections, said ribs and/or projections selectively sized to locate between and contact between the animal's teeth when chewed. The ribs can be made to extend substantially parallel with said body portion length, and the ribs can also be located on said end portion wherein said ribs on said end portion are arranged in either a linear or a semi-circular configuration.

In further related embodiment, the present invention also comprises an animal chew comprising a molded body portion having a plurality of outwardly extending rib projections, the ribs moveable about an arc when the body portion is compressed causing a distal end of the ribs to contact a surface of an animal's teeth.

The above and other objects, features, and advantages of the present invention will be apparent in the following detailed description thereof when read in conjunction with the appended drawings wherein the same reference numerals denote the same or similar parts throughout the several views.

BRIEF DESCRIPTION OF THE DRAWINGS

The invention will be better understood from a reading of the following detailed description of preferred embodiments taken in conjunction with the drawings in which like reference designators are used to designate like elements, and in which.

DETAILED DESCRIPTION OF THE PREFERRED EMBODIMENTS

Figure 1:
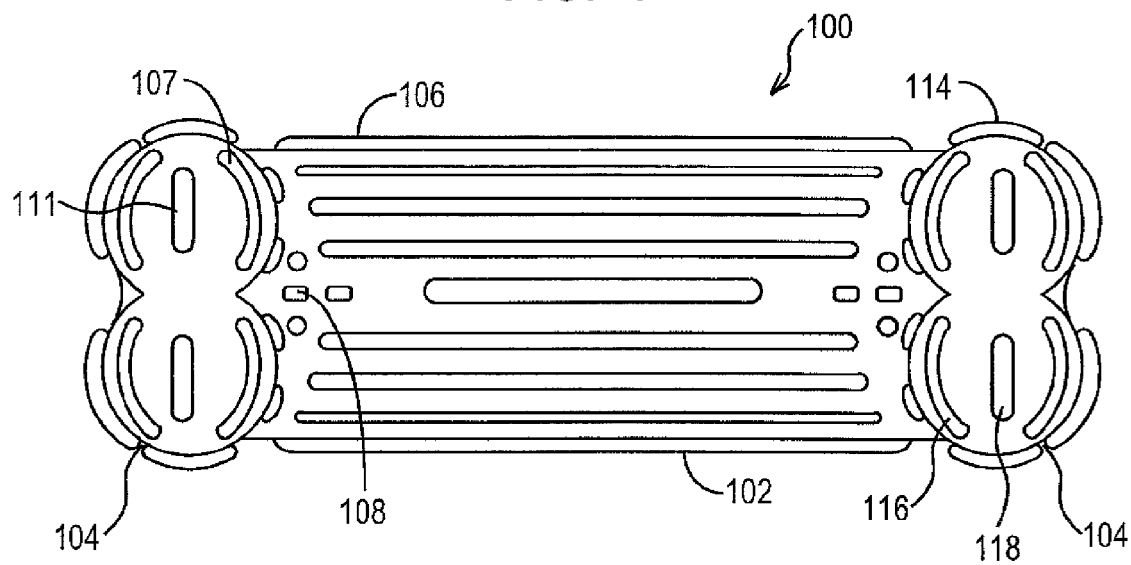
FIG. 1 is a top view of an exemplary animal chew toy consistent with the present invention.
Figure 2:
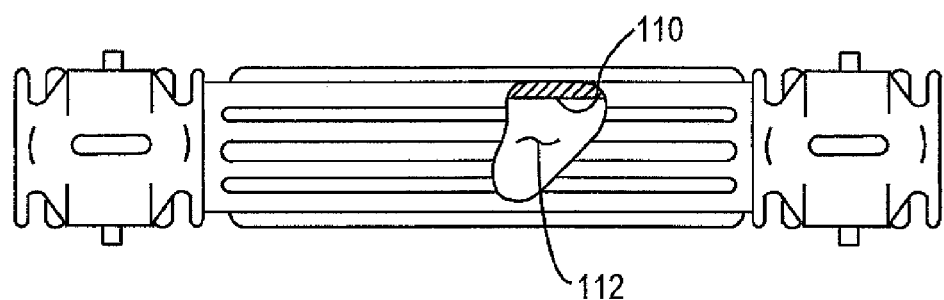
FIG. 2 is a front view of the animal chew toy on FIG. 1.
Figure 3:
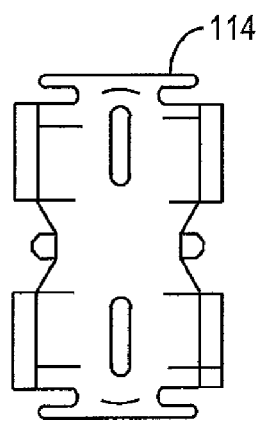
FIG. 3 is a side view of the animal chew toy on FIG. 1.

A dog chew toy 100 is shown most clearly in FIG. 1. The chew 100 may have a traditional bone outline including a body portion 102 having a variable length and an end portion 104 at each end. The end portion can be described as analogous to the so-called knuckle section of a conventional bone, and therefore is wider than the body section of which it is attached.

The body portion 102 and the end portions 104 include a plurality of ribs 106 and projections 108. The body portion 102, end portions 104, ribs 106 and protrusion 108 are all preferably of unitary constriction. In such preferred embodiment the chew toy herein is preferably manufactured by the process of injection molding making use of any material suitable for molding, as more specifically described in further detail, herein. In addition, although not illustrated, it should be appreciated that although the end portions 104 are shown to be of approximately the same representative dimension, the end portions need not be of the same size and shape.

Figure 5:
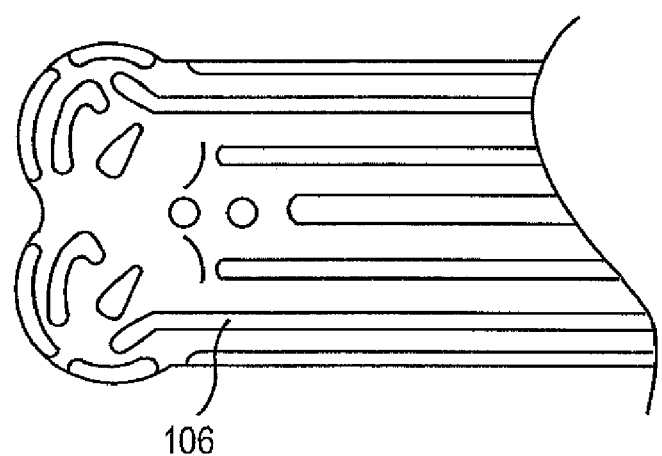
FIG. 5 is another view of the animal chew toy herein, illustrating a preferred configuration of the ribs 106.

The ribs 106 are also preferably of a generally straight configuration and made to extend substantially parallel with the body portion length. Alternatively, the ribs 106 may extend in a substantially parallel configuration along the body portion length and extend into said end portion 104, and at the end portion 104, and as shown in FIG. 5 be configured to deviate from parallel as the rib extends into the end portion of the chew toy.

In addition, preferably, at the end portion 104 ribs are provided that are of a semicircular configuration. For example, with attention directed at FIG. 1, a semicircular rib is shown at 107 protruding from end portion 104.

The chew toy may therefore comprise a first plurality of ribs 106 and a second plurality of ribs 111 perpendicular to the first plurality of ribs. The chew toy may be made of any synthetic or natural polymeric material that can be molded into the aforementioned shape. For example, one may employ nylon, polyester, polyolefin, thermoplastic or thermoset polyurethane, foamed polymer material, including blends or alloy of the aforementioned materials. A suitable natural polymer is starch. One may also uniquely employ casein, in combination with starch, optionally in the presence of a material such peanut flour. In addition, one may employ substantially dehydrated fruit chips, or molded rawhide. In all of these cases, an attractant may also be added.

Preferably, the present invention is directed at an edible animal chew, comprising a molded body portion, with the aforementioned projecting ribs and protrusions, and is made from an edible composition. For example, the chew may be prepared from beef-by-products. Preferably, the beef-by-products may include rawhide. The beef-by-products are preferably present in an amount of about 50% by weight, and in a most preferred embodiment, the beef-by-products are present at a level of about 75% by weight.

In addition, the preferred formulation may include other edible type components, such as protein colloid (1–10% by weight), casein (1–10% by weight), pork-by-products (1–5% by weight), bacon flavor (0.5–5% by weight); parsley (0.1–1.0%); chlorophyll (0.1–1% by weight) and water (5–20% by weight).

According to one exemplary and highly preferred embodiment, the chew toy may be made from a combination of beef and pork by-products mixed with a protein colloid and casein. Consistent with this embodiment, about 80–85 pounds of beef by-product is combined with 5 pounds of protein colloid, 5 pounds of casein and 2 pounds of pork by-products and 8 quarts of water. The mixture may advantageously be combined using melt processing techniques such as melt extrusion and injection molding. During processing, other additives, flavorings and attractants may also be added to the mixture. For example, 10 ounces of natural bacon flavoring, 2 ounces of parsley, and 4 ounces of chlorophyll may be combined during melt processing.

Following melt mixing, the mixture may be dried to adjust the moisture content. Additionally, it may be desirable to grind the mixture into granules or a powder suitable for subsequent molding. Desirably, the mixture may be injection molded into the desired shape using generally conventional injection molding apparatus. Alternatively, the mixture may be compression molded or shaped in to the desired configuration using other known forming processes.

The toy 100 preferably has a cavity 112 formed inside the wall portion 110. Alternatively, the toy may have a core made of a compressible material. The wall portion and the core may be made of different materials. When the toy 100 is compressed by the chewing action of the animal, the ribs 106 or projections 108 flex and may come in contact with the surface of the animal's teeth and/or the animal's gums. The rubbing action of the ribs and projections against the animal's teeth helps remove undesirable food product that if not removed may form tartar. The projections 108 may therefore locate between the animal's teeth to help remove lodged food particles.

Figure 4:
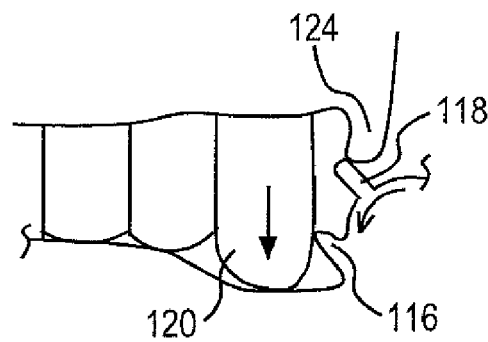
FIG. 4 is a profile view of the animal chew toy of FIG. 1 as the chew toy is chewed by an animal.

Attention is now directed at FIG. 4, which illustrates one of several advantages of the chew toy of the present invention is a simulated chewing illustration. Specifically, when an animal chews in the downward direction as indicated by the downwardly pointing arrow, rib 118 can act to raise the flesh of the animal and facilitate exposure of the animal's teeth 120 to a wiping or cleaning action of rib 116.

Figure 6:
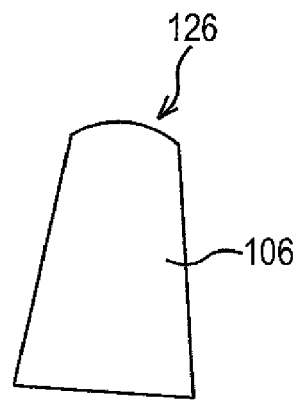
FIG. 6 is view of the preferred cross-sectional configuration for the ribs 106.

In addition, although not specifically illustrated, those of skill in the art will appreciate that when an animal chews down upon the chew toy herein the ribs 106 and/or 107 can be sized such that they strategically fit within the natural gaps of the teeth of the animal, thereby operating to floss between the animal's teeth. In this regard, the ribs 106 can be made such that they taper from a top 126 of a generally hemispheric configuration to a wider base section as shown in FIG. 6, thereby facilitating the extension of the ribs 106 into the spaces between an animal's teeth. In addition, in the broad context of the present invention, and in yet another preferred embodiment, the ribs 106 and projections 108 can be made of a material that is softer (e.g., of a lower durometer hardness as measured by Shore Hardness testing) than the body portion 102 from which they project. Alternatively, a portion of the ribs 106 and projections 108 may be made softer than other ribs and projections, thereby providing a chew toy that contains a combination of ribs and projections of different hardness values, better resembling a natural bone chewing experience.

Finally, as noted herein, the ribs and projections described above are sized to locate between and contact between the animal's teeth when chewed, in a flossing type action. In that regard, it should be noted that puppies, e.g., are known to have 23 baby teeth, and the average adult dog has 42 permanent teeth, however, this can vary some according to specific breed. The lower jaw typically contains 22 teeth, while the upper jaw contains a total of 20 teeth. In either case, the teeth are grouped as follows: front incisors, canines, premolars and molars. The average distance between the incisors, canines and premolar and molars can therefore be readily determined for a given breed, and the ribs and projections can therefore be selectively sized to selectively locate between the front incisors, canines, premolars and molars, according to the need of such breed. Therefore, the invention herein can be uniquely adjusted as may be necessary and can accommodate the dental hygiene requirements of many different jaw profiles.

In the context of adjusting the size of the ribs or projections to accommodate the dental hygiene requirements of animals of various breeds and level of development, advantageous dimensions have been determined based on a general classification of the size of a dog. In that regard, it is noted that the invention herein makes use of a preferred rib projection up to 0.50 inches, and more preferably up to 0.25 inches, and at all 0.05 inch increments therein. Accordingly, the mold cavity to prepare such rib projection is sized to provide such final rib projection dimension subsequent to dehydration of the edible resin and shrinkage.

For example, it has also been found that for certain dogs rib projections or heights molded to provide the final projection dimensional range of 0.10 to 0.50 inches are suitable. For other dogs, rib height projection dimensions may be in the range of 0.10 to 0.40 inches. Rib heights in the range of 0.10–0.30 inches may also be preferred. Again, these dimensions relate to the dimensions of the product. As the moisture level of the chew is reduced subsequent to molding and prior to use, the dimensions of the projections are smaller resulting from shrinkage. Accordingly, the invention herein uniquely recognizes that when it comes to the molding of an edible type chew, with a certain moisture content within the underlying resin used for producing the edible material, and with projections of a size suitable for cleaning of an animal's teeth, one must mold such projections keeping in mind that such projections will shrink significantly due to dehydration.

Similarly, the width of the ribs may be varied to suit the needs of dogs of different sizes. In that regard, the present invention seeks a molded rib dimensional width, at the base of the rib, of up to 0.25 inches, at all 0.01 inch increments therein. However, in more preferred embodiments, exemplary rib widths may be in the range of 0.05–0.20 inches, and other dogs find suitable cleaning action with a width in the range of 0.08–0.15 inches. For other dogs rib widths in the range of 0.12–0.15 inches may be more suitable. In addition, it should be understood that in the context of the present invention, such widths may be varied with the referenced range by a value of +/−0.005 inches, and as noted above, the dimensions recited are the desired dimensions subsequent to drying and shrinkage, and the cavities within the mold to form the ribs are provided with a width value that accommodates the shrinkage herein disclosed.

In addition, with respect to the above discussed feature of shrinkage of the ribs in both projection and width dimension, due to dehydration subsequent to molding, it can also be appreciated that the present invention provides another unique feature, which is the ability to selectively control the dehydration levels in the ribs v. the dehydration that will occur on the animal chew itself. That is, given that the body portion of the chew is generally thicker in cross section than the ribs, the amount of dehydration of such body portion is typically less than the amount of dehydration that may occurs within the ribs themselves. Therefore, in the context of the present invention, as applied to an edible resin with a given moisture content, the present invention allows one to uniquely prepare a chew with ribs that are, subsequent to dehydration, relatively more rigid and with a higher hardness than the body of the chew upon which they may lie. In that regard, the ribs provide the requisite hardness for chewing, while supported on a body section that is relatively softer, thereby providing a useful combination of features to enhance the chewing and intending cleaning action of the product herein.

Furthermore, it should be appreciated that with respect to the injection molding of an edible chew with projecting ribs, it has been found to be relatively difficult, in the sense that edible resins make a complex consideration to form projecting ribs, as such ribs tend to stick and are difficult to remove from the mold without damage. Therefore, in the context of the present invention, the use of an edible resin with a selected moisture content, to provide a projecting rib configuration, which ribs shrink due to dehydration in molding, facilitates the removal of such an edible chew toy design from the mold.

Preferably the ribs also taper from a wider base to a more narrow distal projection. The preceding exemplary widths are widths of the base of the rib. As with the projection or height dimensions, the above exemplary widths are for an animal chew as molded. These dimensions may be smaller in end use state due to shrinkage.

It should be understood that, while the present invention has been described in detail herein, the invention can be embodied otherwise without departing from the principles thereof, and such other embodiments are meant to come within the scope of the present invention as defined in the following claims.

What is claimed is:

1. A method for producing an edible animal chew comprising a molded body portion having a length and an end portion, wherein said chew includes a plurality of outwardly projecting ribs sized to locate between and contact between an animal's teeth when chewed comprising:
   (a) supplying an edible resin with a selected water content;
   (b) supplying a mold for molding said resin wherein said mold includes a mold cavity that forms a molded body portion of said edible animal chew having a length and an end portion, and wherein said mold includes a plurality of cavities for forming said plurality of outwardly projecting ribs;
   (c) selecting a size for said cavities to provide a projection dimension and/or width dimension for said plurality of ribs which projection and/or width dimension is greater than the projection and/or width dimension of the rib desired for said edible animal chew;
   (d) molding said resin into said animal chew containing a plurality of outwardly projecting ribs; and
   (e) removing a quantity of said water in said resin such that the amount of dehydration in said body portion is less than the amount of dehydration in said plurality of ribs and reducing the projection dimension and/or width dimension of said plurality of ribs forming said animal chew, wherein said molded body portion and said projecting ribs each have a thickness and said thickness of said body portion is greater than said thickness of said projecting ribs and said plurality of ribs are relatively more rigid than said body portion.

2. The method of claim 1 wherein said ribs extend substantially parallel with said body portion length, said ribs also located on said end portion wherein said ribs on said end portion are arranged in a semi-circular configuration.

3. The method of claim 1 wherein said body portion, end portion, and ribs are of unitary construction.

4. The method of claim 1 further including at least one outwardly projecting rib extending substantially parallel with said body portion length and extending into said end portion wherein at said end portion said rib deviates from said parallel configuration.

5. The method of claim 1 wherein said ribs comprise a top section and a base section, said base section attached to said body portion wherein said top section is of a hemispheric configuration.

6. The method of claim 1, wherein the chew comprises a first plurality of ribs and a second plurality of ribs, the first plurality of ribs perpendicular to the second plurality of ribs.

7. The method of claim 1 wherein the reduced projection and/or width dimension of said ribs that are sized to locate between and contact between the animal's teeth when chewed include a portion of ribs of a reduced projection and/or width dimension to locate between and contact between the front incisors, canines and molars of said animal.

8. The method of claim 1 wherein subsequent to removing a quantity of said water in said resin and reducing the projection dimension and/or width dimension of said plurality of ribs forming said animal chew, said ribs have a projection dimension of up to about 0.50 inches.

9. The method of claim 1 wherein subsequent to removing a quantity of said water in said resin and reducing the projection dimension and/or width dimension of said plurality of ribs forming said animal chew, said ribs have a width dimension of up to about 0.25 inches.

10. The method of claim 1 wherein said edible animal chew is formed from beef by-products wherein said beef by-product is present at a level of at least about 50% by weight.

11. The method of claim 1 wherein said edible animal chew is formed from beef by-products, wherein said beef by-product is present at a level of at least about 75% by weight.

12. The method of claim 1 wherein said edible animal chew is formed from beef by-product at a level of about 70–75% by weight, the remainder of the composition comprising protein colloid in an amount of about 1–10% by weight, casein in an amount of about 1–10% by weight, pork by-products in an amount of about 1–5% by weight, flavoring in an amount of 0.5–5.0% by weight, parsley in an amount of about 0.1–1.0% by weight, chlorophyll in an amount of about 0.1–1% by weight and water in an amount of 5–20% by weight.

13. A method for producing an edible animal chew comprising a molded body portion having a length and an end portion, wherein said chew includes a plurality of outwardly projecting ribs sized to locate between and contact between an animal's teeth when chewed comprising:
(a) supplying an edible resin with a selected water content;
(b) supplying a mold for molding said resin wherein said mold includes a mold cavity that forms a molded body portion of said edible animal chew having a length and an end portion, and wherein said mold includes a plurality of cavities for forming said plurality of outwardly projecting ribs;
(c) selecting a size for said cavities to provide a projection dimension and/or width dimension for said plurality of ribs which projection and/or width dimension is greater than the projection and/or width dimension of the rib desired for said edible animal chew;
(d) molding said resin into said animal chew containing a plurality of outwardly projecting ribs; and
(e) removing a quantity of said water in said resin and reducing the projection dimension and/or width dimension of said plurality of ribs forming said animal chew; and
(f) removing a quantity of water from said molded body portion wherein the amount of dehydration in the molded body portion is less than the amount of dehydration in said ribs, wherein said molded body portion and said projecting ribs each have a thickness and said thickness of said body portion is greater than said thickness of said projecting ribs and said plurality of ribs are relatively more rigid than said body portion.

14. An edible animal chew, comprising a molded body portion formed from beef by-products having a length and an end portion, said chew including a plurality of outwardly projecting ribs and/or projections, said ribs and/or projections sized to locate between and contact between an animal's teeth when chewed, wherein said molded body portion and said projecting ribs each have a thickness and said thickness of said body portion is greater than said thickness of said projecting ribs and said plurality of ribs are relatively more rigid than said body portion.

15. The animal chew of claim 14 wherein said ribs extend substantially parallel with said body portion length, said ribs also located on said end portion wherein said ribs on said end portion are arranged in a semi-circular configuration.

16. The animal chew of claim 14 wherein said body portion, end portion, ribs and/or projections are of unitary construction.

17. The animal chew of claim 14 further including at least one outwardly projecting rib extending substantially parallel with said body portion length and extending into said end portion wherein at said end portion said rib deviates from said parallel configuration.

18. The animal chew of claim 14 wherein said ribs comprise a top section and a base section, said base section attached to said body portion wherein said top section is of a hemispheric configuration.

19. The animal chew of claim 14, wherein the chew toy comprises a first plurality of ribs and a second plurality of ribs, the first plurality of ribs perpendicular to the second plurality of ribs.

20. The animal chew of claim 14 wherein said ribs and/or projections sized to locate between and contact between the animal's teeth when chewed include a portion of ribs or projections sized to locate between and contact between the front incisors, canines and molars of said animal.

21. The animal chew of claim 14 wherein said ribs have a projection dimension of up to about 0.50 inches.

22. The animal chew of claim 14 wherein said ribs have a width dimension of up to about 0.25 inches.

23. The animal chew of claim 14 wherein said animal chew is formed from beef by-products wherein said beef by-product is present at a level of at least about 50% by weight.

24. The animal chew of claim 14 wherein said animal chew is formed from beef by-products, wherein said beef by-product is present at a level of at least about 75% by weight.

25. The animal chew of claim 14 wherein said animal chew is formed from beef by-product at a level of about 70–75% by weight, the remainder of the composition comprising protein colloid in an amount of about 1–10% by weight, casein in an amount of about 1–10% by weight, pork by-products in an amount of about 1–5% by weight, flavoring in an amount of 0.5–5.0% by weight, parsley in an amount of about 0.1–1.0% by weight, chlorophyll in an amount of about 0.1–1% by weight and water in an amount of 5–20% by weight.

* * * * *